(12) United States Patent
Savage, Jr.

(10) Patent No.: US 9,345,082 B2
(45) Date of Patent: *May 17, 2016

(54) CURRENT REGULATED LED STROBE DRIVE CIRCUIT

(71) Applicant: Tyco Fire & Security GmbH, Neuhausen am Rheinfall (CH)

(72) Inventor: Kenneth E Savage, Jr., Fitchburg, MA (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 7 days.

This patent is subject to a terminal disclaimer.

(21) Appl. No.: 14/315,721

(22) Filed: Jun. 26, 2014

(65) Prior Publication Data

US 2015/0077007 A1 Mar. 19, 2015

Related U.S. Application Data

(63) Continuation-in-part of application No. 13/525,427, filed on Jun. 18, 2012, now Pat. No. 8,796,931.

(51) Int. Cl.
| | |
|---|---|
| *H05B 37/02* | (2006.01) |
| *H05B 41/00* | (2006.01) |
| *H05B 33/08* | (2006.01) |
| *H02J 7/34* | (2006.01) |
| *H02M 3/156* | (2006.01) |

(52) U.S. Cl.
CPC ............ *H05B 33/0815* (2013.01); *H02J 7/345* (2013.01); *H02M 3/156* (2013.01); *H05B 33/0842* (2013.01); *H05B 33/0845* (2013.01); *H05B 33/0887* (2013.01); *Y02B 20/346* (2013.01); *Y02B 20/347* (2013.01)

(58) Field of Classification Search
CPC ........... H05B 33/0815; H05B 33/0842; H05B 33/0845; H05B 33/0887; H05B 33/0896; H05B 41/34; Y02B 20/346; Y02B 20/347; G08B 5/38; Y10T 307/74; H02J 7/345; H02M 3/156

See application file for complete search history.

(56) References Cited

U.S. PATENT DOCUMENTS

| | | | | |
|---|---|---|---|---|
| 5,400,203 | A * | 3/1995 | Tice ................................. | 361/62 |
| 8,044,610 | B2 * | 10/2011 | Sandner et al. ................ | 315/297 |
| 8,242,710 | B2 * | 8/2012 | Radermacher et al. ........ | 315/306 |
| 2014/0217261 | A1 * | 8/2014 | De Groot et al. .............. | 250/205 |

FOREIGN PATENT DOCUMENTS

WO WO 2005/098773 * 10/2005

* cited by examiner

*Primary Examiner* — Vibol Tan
(74) *Attorney, Agent, or Firm* — Kacvinsky Daisak Bluni PLLC

(57) ABSTRACT

A current regulating LED strobe drive circuit including an energy storage component, a current regulator electrically coupled to the energy storage component for sensing and regulating a current supplied by the energy storage element, a LED electrically coupled to the current regulator, a flash control element electrically coupled to the current regulator for generating a flash pulse signal that dictates a pulsed pattern with which current is allowed to flow from the current regulator to the LED, an output control having an operator interface for allowing an operator to select a desired light output level, wherein the output control is electrically coupled to the current regulator for varying the amount of current supplied to the LED, and an inrush control including a plurality of slow charge circuits, wherein each slow charge circuit is configured to provide a respective peak current for charging the energy storage component.

16 Claims, 8 Drawing Sheets

CURRENT REGULATED LED STROBE DRIVE CIRCUIT

This application is a continuation-in-part of U.S. patent application Ser. No. 13/525,427, filed Jun. 18, 2012, the entirety of which is incorporated herein by reference.

FIELD OF THE DISCLOSURE

The disclosure relates generally to optical element driving circuits, and more particularly to a current regulating drive circuit for LED strobe lights.

BACKGROUND OF THE DISCLOSURE

Emergency notification systems, such as fire alarm systems, typically include one or more notification appliances for providing occupants of a building with a prominent visual or auditory indication of a hazardous condition, such as the presence of smoke or fire. A notification appliance circuit (NAC) connects the notification appliances to a central control panel, such as a fire alarm control panel. A primary power source, such as line power from an AC line, may supply power to the control panel. The NAC may thus provide power from the control panel to the notification appliances.

A notification appliance that is commonly employed in emergency notification systems is a strobe. The most common type of strobe is a Xenon flash tube based strobe. Light emitting diode (LED) strobes have recently been introduced into the marketplace and offer prospects of lower energy consumption. A notification system may include dozens, or even hundreds, of strobes distributed throughout a building. A first important consideration when designing a notification system that employs strobes is the energy efficiency of the strobes. It is generally preferable to maximize the number of strobes connected in series on a single NAC of a notification system in order to minimize wiring requirements and to reduce the overall cost of installing the notification system. It is generally also preferable to minimize the current requirements of a NAC in order to reduce energy consumption and operating costs. Employing strobes that operate more efficiently allows a greater number of strobes to be connected to a NAC at a lower current draw relative to strobes that operate less efficiently.

A second important consideration when designing a notification system that employs strobes is the ability of the strobes to deliver consistent light output, including consistent color and intensity, during operation. National Fire Protection Association (NFPA) requirements dictate that notification system strobe lights output a minimum total amount of light over a given time period for a given area. A strobe that lacks consistency and produces varying levels of light output from flash to flash may cumulatively project too little light over a given time period and thus fail to meet the NFPA output requirement. Conversely, an inconsistent strobe may produce a cumulative amount of light over a given time period that greatly exceeds the NFPA output requirement, thereby compromising the efficiency of the NAC. Consistent light output is therefore critical for ensuring compliance with NFPA requirements while optimizing system efficiency.

Referring to FIG. 1, a schematic diagram of a conventional drive circuit 10 for an LED strobe application is shown. The drive circuit 10 includes a buck convertor or boost convertor 12 for stepping down or stepping up a NAC input voltage, respectively, a current limiting resistor 14, a LED 16, and a transistor switch 18 for flashing the LED 16. While generally effective for providing a strobe, this configuration exhibits certain inefficiencies and can cause significant variations in light output among a group of serially-connected LED strobe units. For example, with regard to efficiency, an embodiment of the drive circuit 10 that employs a buck convertor at 12 requires a minimum convertor input voltage that is greater than the convertor's regulated output voltage which is greater than the stack up voltage of the LED 16 and other drive circuit elements. Alternatively, an embodiment of the drive circuit 10 that employs a boost convertor at 12 requires a minimum input voltage for facilitating a defined duty cycle for proper boost operation. The output voltage of the boost convertor 12 must also be greater than the stack up voltage of the LED 16 and other drive circuit elements. Thus, for either embodiment of the drive circuit 10, a substantial amount of energy is wasted during operation.

With regard to light output, the tolerances of the energy source voltage, the current limiting resistor 14, the LED's forward voltage drop, and the voltage drop across the switch element 18 of the drive circuit 10 can all affect the amount of current passing through the LED 16, thereby diminishing the consistency of the LED's output. While the tolerances of the energy source components, limiting resistor 14, and switch element 18 can be narrowed by implementing components with tighter tolerances, the forward voltage drop across the LED 16 can nonetheless vary by 15% or more from the effects of drive current, duty cycle, thermal resistance, and ambient temperature on the LED's junction. LED output may therefore be highly inconsistent and may vary in color and intensity during strobe operation.

SUMMARY

In view of the forgoing, it would be advantageous to provide an LED strobe that operates efficiently and consistently relative to existing LED strobe appliances. In accordance with the present disclosure, a current regulating LED strobe drive circuit is disclosed for efficiently producing an LED strobe that is consistent in both intensity and color. The drive circuit may include a filter/energy storage element, a current regulator, a flash control element, and an LED.

An embodiment of a variable output LED strobe drive circuit in accordance with the present disclosure may include an energy storage component, a current regulator electrically coupled to the energy storage component for sensing and regulating a current supplied by the energy storage element, a LED electrically coupled to the current regulator, a flash control element electrically coupled to the current regulator for generating a flash pulse signal that dictates a pulsed pattern with which current is allowed to flow from the current regulator to the LED, an output control having an operator interface for allowing an operator to select a desired light output level, wherein the output control is electrically coupled to the current regulator for varying the amount of current supplied to the LED, and an inrush control including a plurality of slow charge circuits, wherein each slow charge circuit is configured to provide a respective peak current for charging the energy storage component.

A further embodiment of a variable output LED strobe drive circuit in accordance with the present disclosure may include a current sensing element, a LED electrically coupled to the current sensing element, a current regulator electrically coupled to the current sensing element and to the LED for supplying an amount of current to the LED in response to a current sensed by the current sensing element, a switch electrically coupled to the current regulator and to the LED for generating a flash pulse signal that dictates a pulsed pattern with which current is allowed to flow to the LED, an output control having an operator interface for allowing an operator to select a desired light output level, wherein the output control is electrically coupled to the current regulator for varying the amount of current supplied to the LED, and an inrush control including a plurality of slow charge circuits, wherein each slow charge circuit is configured to provide a respective peak current for charging the energy storage component by an amount that corresponds to the operator-selected light output level.

An embodiment of a method for implementing a variable output LED strobe drive circuit in accordance with the present disclosure may include charging an energy storage element with an input current, selecting a first light output level generating a pulsed electrical signal that is in part defined by the selected light output level, allowing current to flow from the energy storage element to the LED in accordance with the pulsed electrical signal, sensing the input current and providing a corresponding regulated current to the LED, and recharging the energy storage element by applying the input current to a first slow charge circuit having a first peak current that corresponds to the selected first light output level.

BRIEF DESCRIPTION OF THE DRAWINGS

By way of example, a specific embodiment of the disclosed device will now be described, with reference to the accompanying drawings, in which.

DETAILED DESCRIPTION

Figure 1:
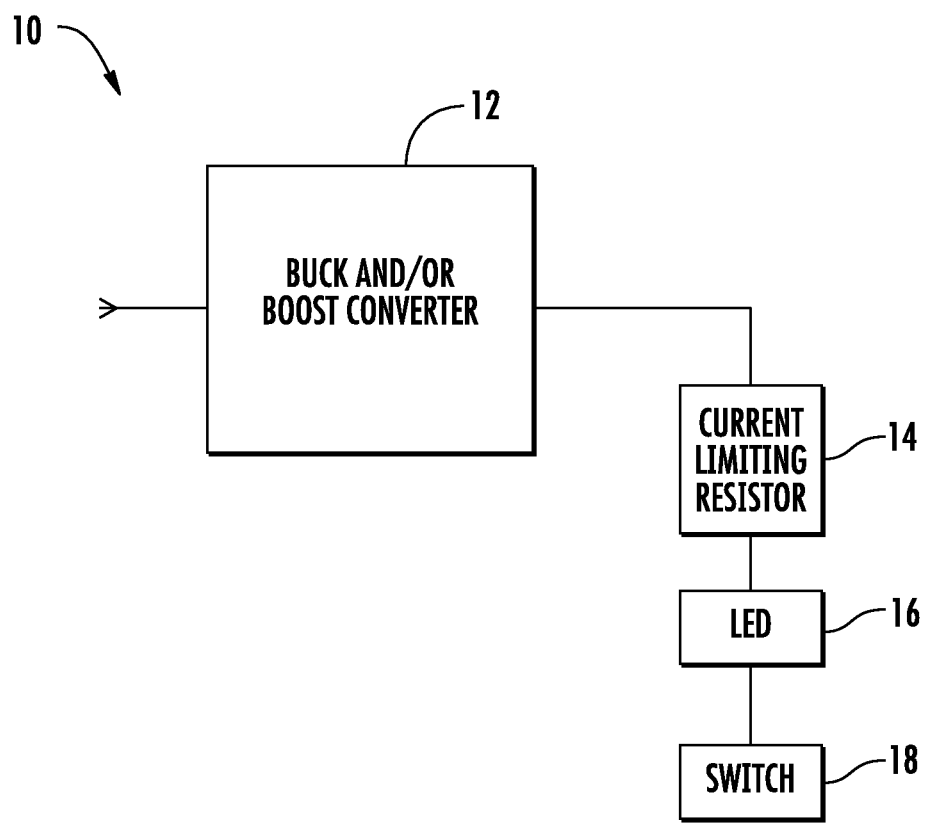
FIG. 1 is a schematic diagram illustrating a prior art LED strobe drive circuit.
Figure 2:
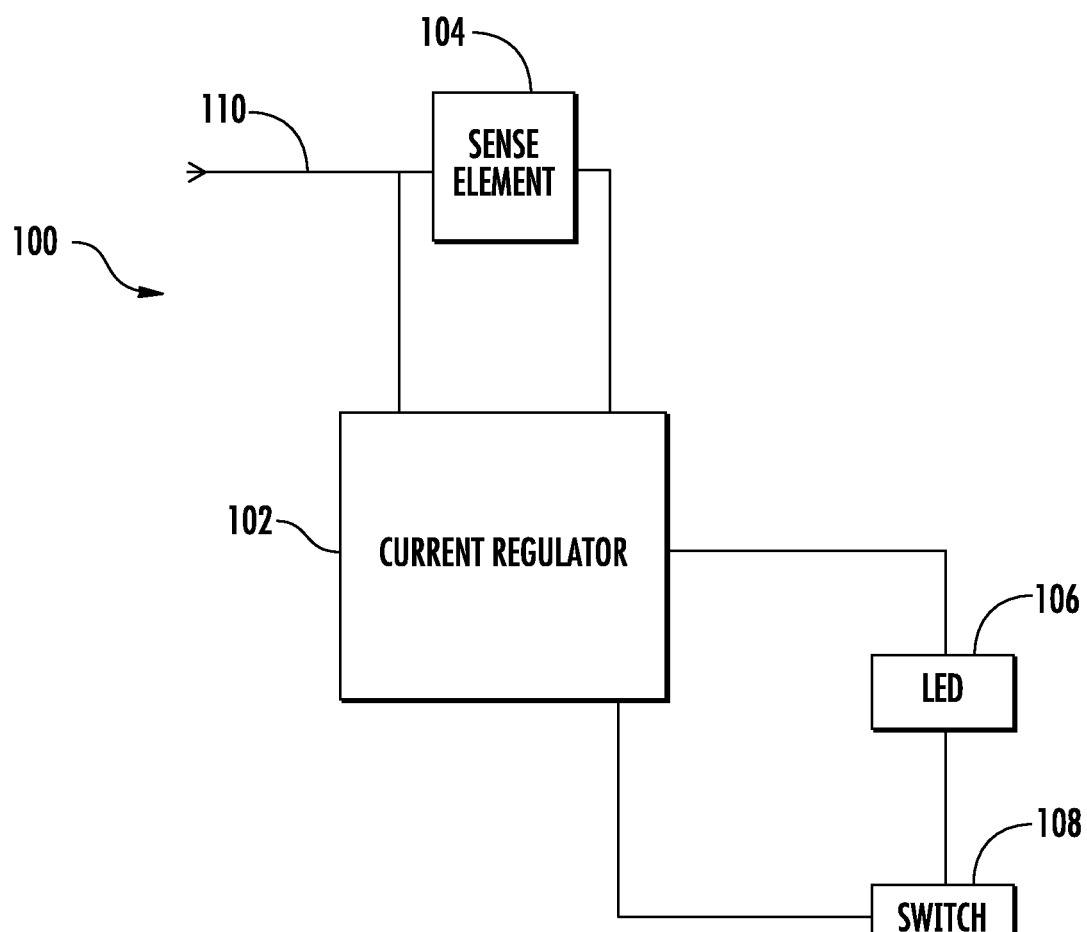
FIG. 2 is a high level schematic diagram illustrating an LED strobe drive circuit in accordance with an embodiment of the present disclosure.

Referring to FIG. 2, an embodiment of an LED strobe drive circuit 100 in accordance with the present disclosure is shown. The drive circuit 100 may generally include a current regulator 102, a sense element 104, an LED 106 and a switch 108. The drive circuit 100 may be electrically connected to a NAC input line 110. The NAC may be a component of an emergency notification system, such as a fire alarm system installed in a building, and may be electrically connected to one or more additional LED strobes or other notification appliances, such as in a series configuration. It will be appreciated by those of ordinary skill in the art that the particular drive circuit configuration shown in FIG. 2 is provided by way of example only, and that the drive circuit 100 can be implemented using a variety of alternative circuit configurations without departing from the present disclosure.

The current regulator 102 of the drive circuit 100 may be implemented using a control device such as a microcontroller, application specific integrated circuit (ASIC), or other suitable control device. In general, the current regulator 102 receives as input a sensed input current from the sense element 104 and, in response to the sensed current, delivers a regulated amount of current from the NAC wiring 110 to the LED 106. The switch element 108 is provided for turning the LED on and off in a predefined pattern (i.e., with predefined duration and frequency characteristics), thereby causing the LED 106 to flash in a corresponding pattern.

Figure 3:
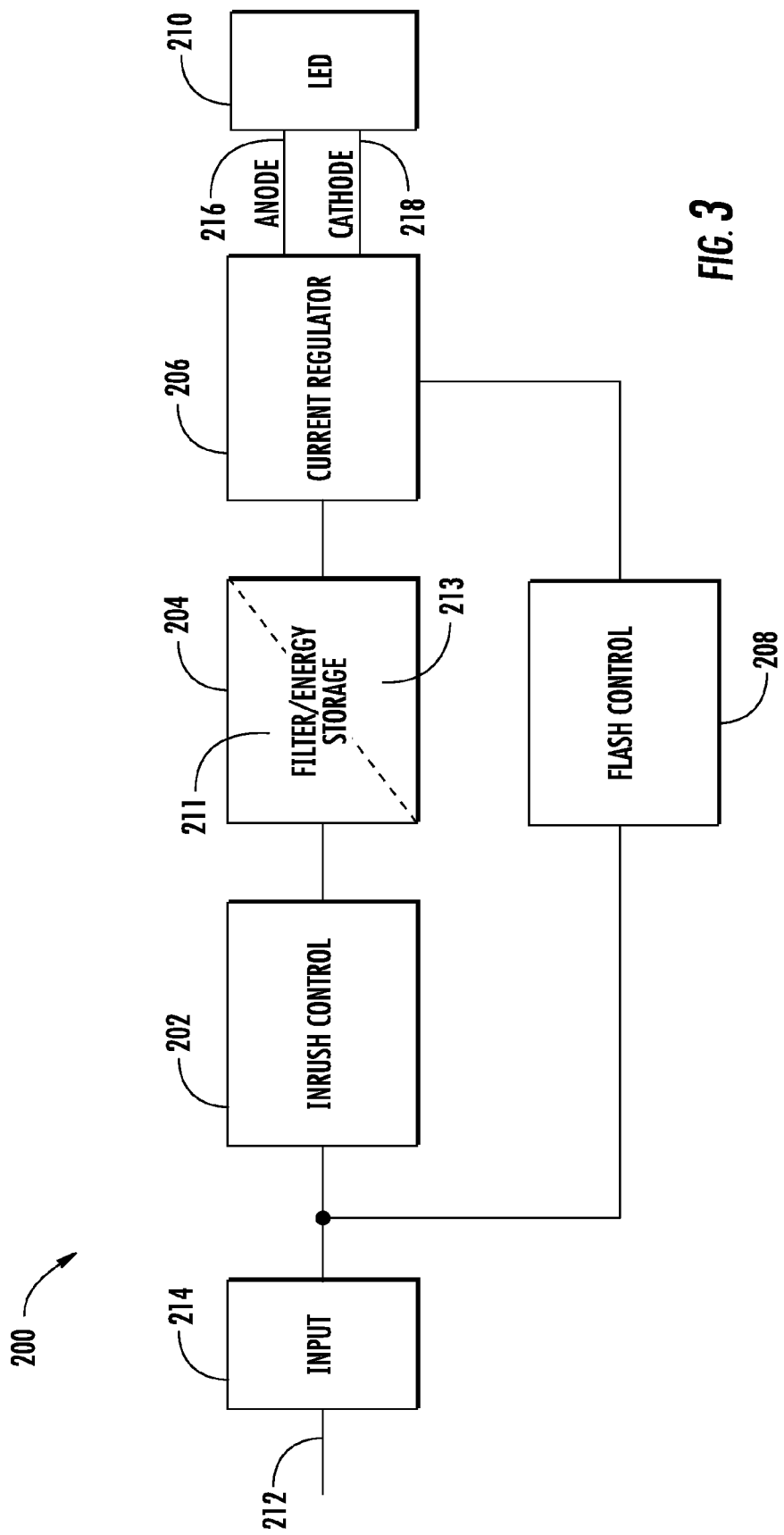
FIG. 3 is a lower level schematic diagram illustrating an LED strobe drive circuit in accordance with an embodiment of the present disclosure.

Referring to FIG. 3, a schematic diagram of an embodiment of an LED strobe drive circuit 200 in accordance with the present disclosure is shown. The drive circuit 200 may generally include an inrush control 202, a filter/energy storage element 204, a current regulator 206, and a flash control element 208, connected to LED 210. The drive circuit may be electrically connected to a NAC input line 212 at input terminals 214.

The inrush control 202 of the drive circuit 200 may be electrically connected to the input terminals 214 and is provided for limiting the amount of current that is allowed to flow to the drive circuit 200 immediately after activation. The inrush control 202 thereby mitigates the possibility of damage to the other components of the drive circuit 200 that could otherwise result from startup current surges. It is contemplated that virtually any type of passive or active current limiting component can be implemented for effectuating the inrush control 202, including, but not limited to, negative temperature coefficient (NTC) thermistors ("surge limiters"), triacs, resistors, thyristors, and various combinations thereof, along with appropriate circuitry for driving such elements as will be understood by those of ordinary skill in the art. For example, a possible embodiment of the inrush control 202 is presented in FIG. 4 at 302 and will be discussed in greater detail below. Alternative embodiments of the drive circuit 200 are contemplated in which the inrush control 202 is omitted.

The filter/energy storage element 204 of the drive circuit 200 may be electrically connected in series with the inrush control 202, opposite the input terminals 214. A filter component 211 of the filter/energy storage element 204 is provided for preventing electrical signal noise generated by the current regulator 206 (described below) from being transmitted into the NAC wiring 212. The filter component 211 may include virtually any type of suitable signal filtering component, device, or arrangement, including, but not limited to, LC filters, chokes, ferrite beads, and simple inductors such as the inductor 312 shown in FIG. 4.

Figure 4:
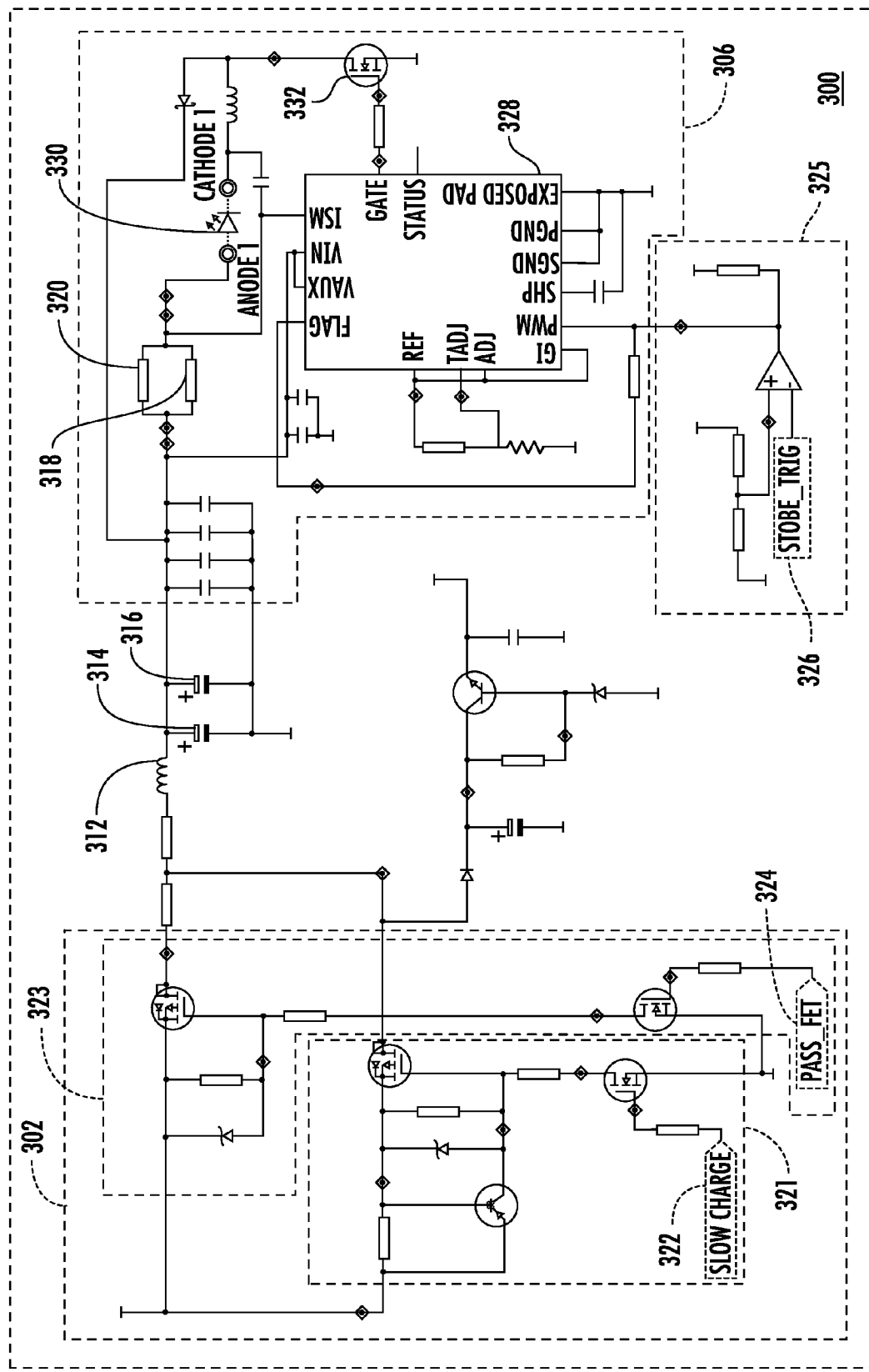
FIG. 4 is a circuit diagram illustrating an LED strobe drive circuit in accordance with an embodiment of the present disclosure.

A storage component of the filter/energy storage element 204 is provided for storing and supplying energy to flash the LED 210 as further described below. The storage component may be implemented using virtually any type of suitable electrical energy storage component, device, or arrangement that can be controllably discharged, including, but not limited to, inductors and capacitors coupled in a variety of configurations, such as the pair of capacitors 314 and 316 coupled in parallel as shown in FIG. 4. Although the filter and storage components 211 and 213 define a single circuit element 204 in FIG. 3, it is contemplated that the filter and storage components 211 and 213 can alternatively be implemented in separate, independent elements of the drive circuit 200. It is further contemplated that the filter component 211 of the filter/energy storage element 204 can be entirely omitted from the drive circuit 200.

The current regulator 206 of the drive circuit 200 may be electrically connected in series with the filter/energy storage element 204, opposite the inrush control 202. The current regulator 206 is provided for measuring and supplementing the steady state operating current that is supplied to the LED 210 in a predefined manner. Particularly, the current regulator 206 delivers a consistent level of operating current to the LED 210 during strobe operation regardless of current fluctuations elsewhere in the drive circuit 200, such as may be caused by forward voltage drops across other circuit components. The current regulator 206 thereby facilitates consistent light output from the LED 210 from flash to flash as further described below. The specific steady state operating current will generally depend on the particular type of LED used.

The current regulator 206 may be implemented using virtually any suitable current regulating component, device, or arrangement that is capable of managing the total amount of current that is delivered to the LED 210. For example, referring to the exemplary drive circuit 300 shown in FIG. 4, the current regulator 306 may be implemented using a pair of resistors 318 and 320 coupled in parallel for sensing an amount of current that is output by the capacitors 314 and 316, and an LED driver 328 configured to deliver an amount of current to the LED 330 in response to the sensed current as described in greater detail below. The LED driver 328 may be implemented using any type of suitable control device, including, but not limited to, a microcontroller, ASIC, or other control device, such as the integrated circuit shown in FIG. 4.

The LED 210 may be a conventional light emitting diode having an anode terminal 216 and a cathode terminal 218 electrically connected to the current regulator 206, opposite the filter/energy storage element 204. The LED 210 is provided for emitting light when supplied with current by the current regulator 206, such as during strobe operation, as further described below. The LED 210 may be capable of emitting at least about 15 candela of light to meet minimum NFPA requirements. It is contemplated that the LED 210 can be any color (or can be provided with a lens of any color) that is appropriate for a particular application. For example, white notification lights are typically used for fire applications, while amber notification lights are typically used for mass notification applications. It is further contemplated that the drive circuit 200 can include more than one LED 210 of the same or different color, and that such plurality of LEDs 210 can be flashed simultaneously or in a predefined pattern.

The flash control element 208 of the drive circuit 200 may be electrically connected intermediate a control input line from the NAC (such as may be integral with the input line 212) and the current regulator 206. The flash control element 208 is provided for outputting, in response to an activation signal from the NAC, a pulsed flash signal that dictates a correspondingly-pulsed current pattern that is allowed to pass from the current regulator 206 to the LED 210, thereby causing the LED 210 to generate a strobe pattern with predefined duration and frequency characteristics. For example, the flash control element 208 may generate a flash signal with 100 ms pulses at a frequency of ~1.5 Hz for causing the LED 210 to produce 100 ms light flashes at a frequency of ~1.5 Hz. The flash control element 208 may be implemented using virtually any suitable component, device, or arrangement that is capable of producing, in response to an input control signal, a pulsed flash signal having predefined duration and frequency characteristics. For example, the current regulator 206 may be implemented using an appropriately configured microcontroller or application specific integrated circuit (ASIC) as further described below.

Typical operation of the LED strobe drive circuit 200 will now be described with respect to the exemplary drive circuit 300 shown in FIG. 4 and the flow diagram shown in FIG. 6. However, it will be appreciated that many other circuit configurations and component arrangements may be employed for implementing the drive circuit 200 in a similar manner without departing from the spirit and the scope of the present disclosure.

Figure 6:
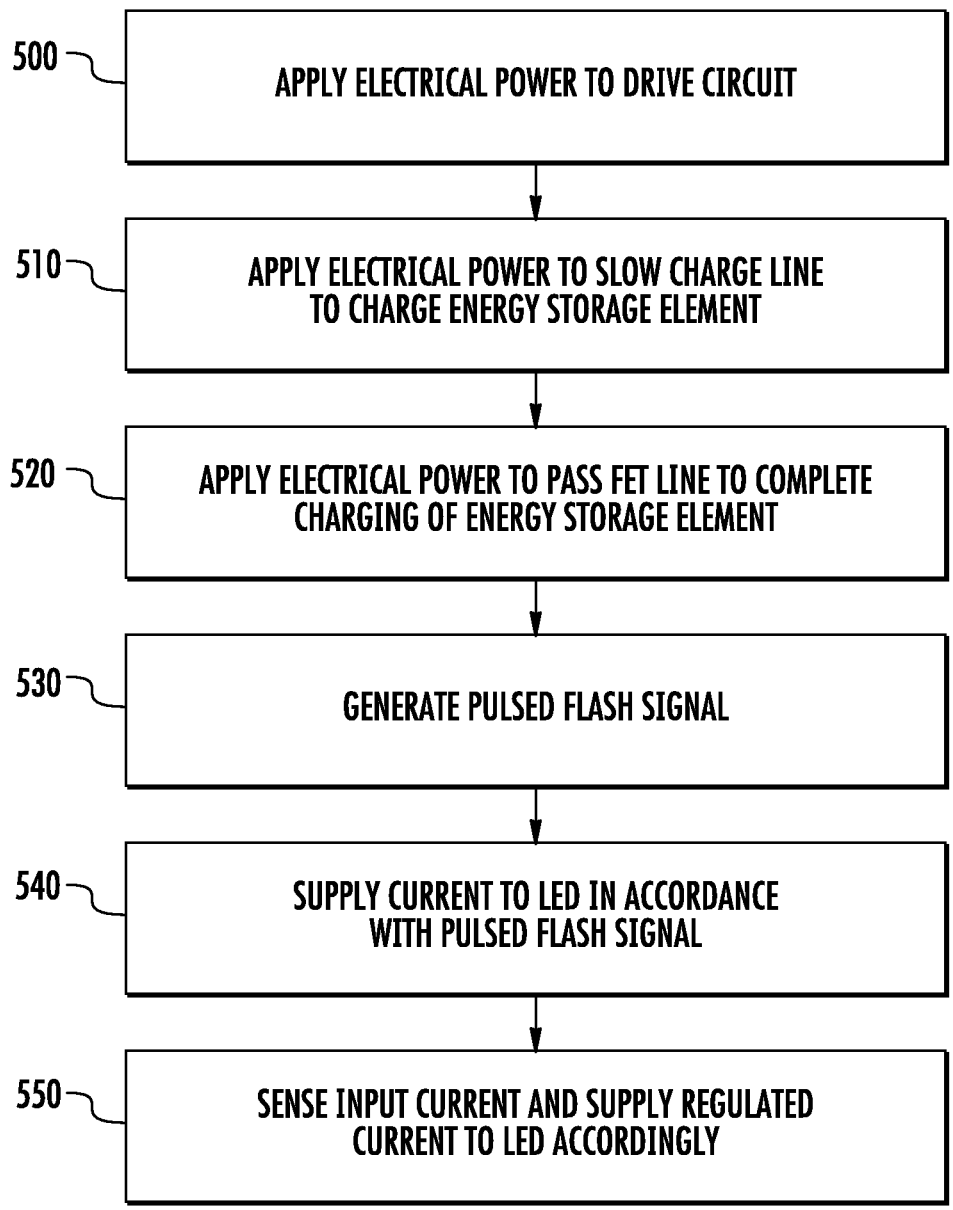
FIG. 6 is a flow diagram illustrating a method of operating the drive circuit shown in FIG. 4 in accordance with the present disclosure.

Operation of the LED strobe drive circuit 300 may be initiated by the application of electrical power to the drive circuit 300 by an NAC (not shown), such as may be provided upon the detection of a hazardous condition by sensing elements within an emergency notification system (step 500 in FIG. 6). A control device (not shown) may receive the electrical power from the NAC and apply at least a portion of the power on a slow charge control line 322 of a slow charge circuit 321 to slowly charge the capacitors 314 and 316 (step 510 in FIG. 6) via slow charge circuit 321. This avoids placing a large current draw on the NAC upon circuit activation (such as may be caused by an initial spike in current) that could otherwise cause the NAC to reach an overcurrent condition when a plurality of serially-connected drive circuits are activated simultaneously. As the capacitors 314 and 316 approach full charge, the control device applies current to a bypass control line 324 of the energizing circuit 323, thereby bypassing the slow charge circuit 321 to charge the capacitors 314 and 316 to a level substantially equal to the input voltage from the NAC (step 520 in FIG. 6). Completing the charging of the capacitors 314 and 316 in this manner overcomes the voltage drop associated with the slow charge circuit.

A control device (not shown), which may be the same control device discussed above, may receive an activation signal from the NAC. In response to the activation signal, the control device applies a pulsed flash signal on a strobe trigger line 326 of driver interface circuit 325 (step 530 in FIG. 6). As described above, the flash signal has a predefined duration and frequency characteristics, such as may be configured in the control device. It is contemplated that the characteristics of the flash signal can be manually adjusted as will be described below.

The flash signal output from the driver interface circuit 325 is applied to the LED driver 328, which also receives an input current from the current sensing resistors 318 and 320. The LED driver 328 is configured to supply current to the LED 330 in a pulsed pattern that substantially mirrors the duration and frequency characteristics of the flash signal on the strobe trigger line 326 (step 540 in FIG. 6). The LED 330 is thereby caused to emit a strobe pattern that also substantially mirrors the duration and frequency characteristics of the predefined flash signal.

To achieve current regulation, the LED driver 328 senses the input current at the resistors 318 and 320 and provides current to the LED 330 by cycling the switch 332 as necessary to intermittently establish a path for current to flow from the LED driver 328 to the LED 330 to account for voltage drops in the circuit 300 (step 550 in FIG. 6). The LED 330 is thereby provided with a highly regulated level of current that is consistent from pulse to pulse, thus resulting in strobe flashes that are consistent in both intensity and color. The inductor 312 is provided for preventing electrical signal noise generated by the current regulating components of the drive circuit 300 from being transmitted into the NAC wiring.

Figure 5:
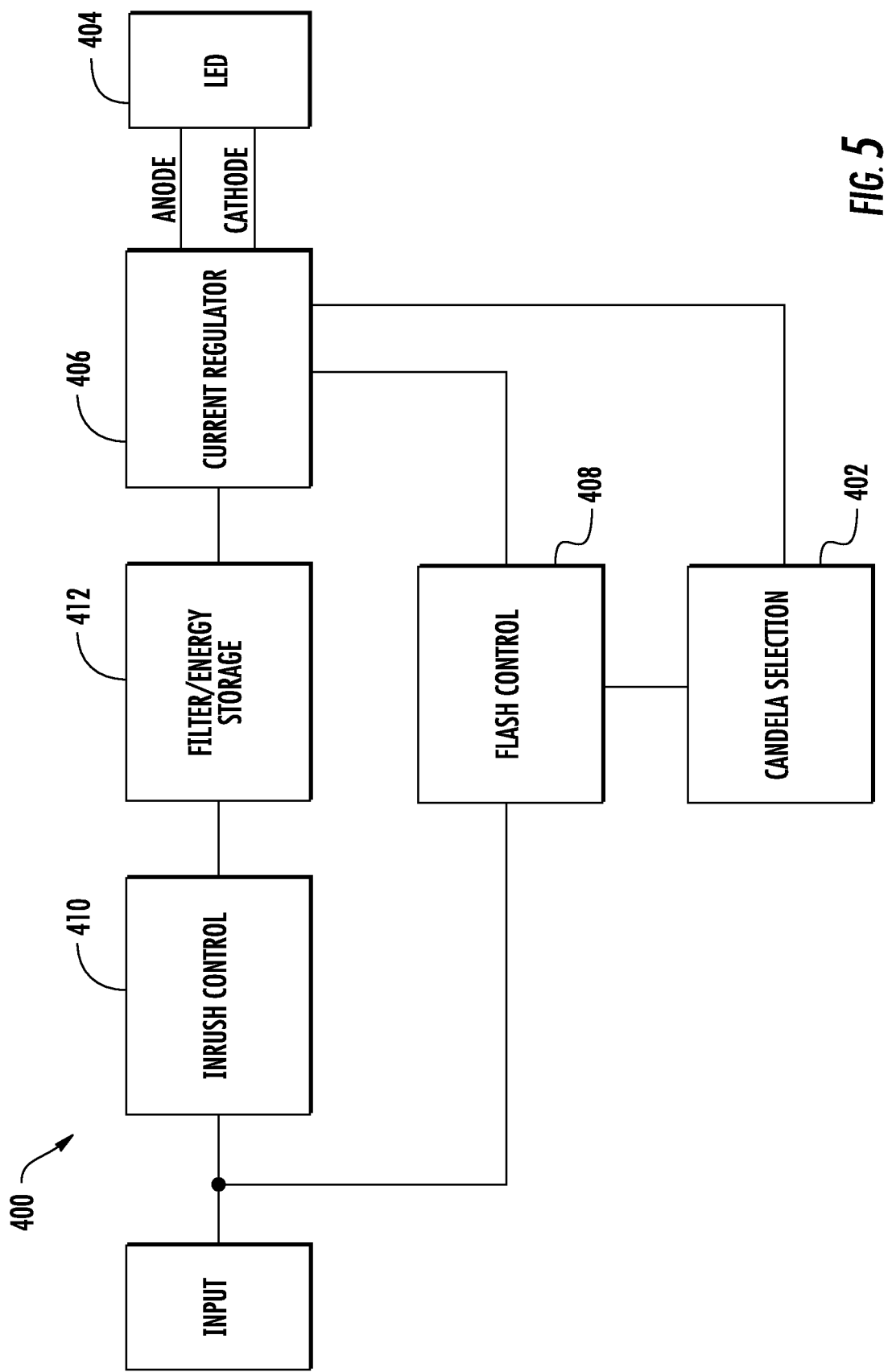
FIG. 5 is a schematic diagram illustrating an LED strobe drive circuit in accordance with an alternative embodiment of the present disclosure that incorporates an output control element.

Referring to FIG. 5, an alternative drive circuit 400 in accordance with the present disclosure is shown. Like the drive circuit 200 described above, the drive circuit 400 may include an output control 402 for allowing an operator to selectively regulate a quantity of light that is output by the LED 404 over a period of time, such as may be desirable for ensuring compliance with NFPA guidelines. The output control 402 may be implemented using a control device, and includes an operator interface, such as a dial, knob, lever, or buttons, for allowing an operator to specify a desired light output level (e.g., a desired candela output). The output control 402 can be implemented in a variety of different ways for regulating the quantity of light produced by the LED 404 in accordance with the output level specified by the operator. For example, it is contemplated that the output control 402 can be coupled to the current regulator 406 for selectively varying the degree to which the input current is supplemented thereby as described above. The amount of current supplied to the LED 404 each time it is flashed can thereby be increased or decreased, thus increasing or decreasing the total candela output of the LED 404 over time. Additionally or alternatively, it is contemplated that the output control 402 can be coupled to the flash control element 408 for selectively varying the duration and/or frequency characteristics of the flash pulse generated by the flash control element 408. The duration of each flash and/or the frequency of the flashes produced by LED 404 can thereby be increased or decreased, thus increasing or decreasing the total candela output of the LED 404 over time.

In order to improve the efficiency of the variable output drive circuit 400, it may be beneficial to implement an inrush control 410 having multiple slow charge circuits that correspond to various operator-selectable output settings of the drive circuit 400. This is because an inrush control having a single slow charge circuit provides only a single, high peak current limit for both an initial charge and subsequent recharging of the energy storage element 412 of the drive circuit 400, regardless of the operator-selected output level. Thus, if an output level is selected that uses less than a full charge of the energy storage element 412 to flash the LED 404, the inrush control 410 will nonetheless draw the peak current in order to recharge the energy storage element 412 even though less than the peak current is required to achieve a full charge. This requirement for consistent, high peak current draw may limit the number of drive circuits that can be implemented in a NAC because the peak current will be a limiting factor for both IR losses in the NAC wiring and loading on a power supply that feeds the NAC.

Figure 7:
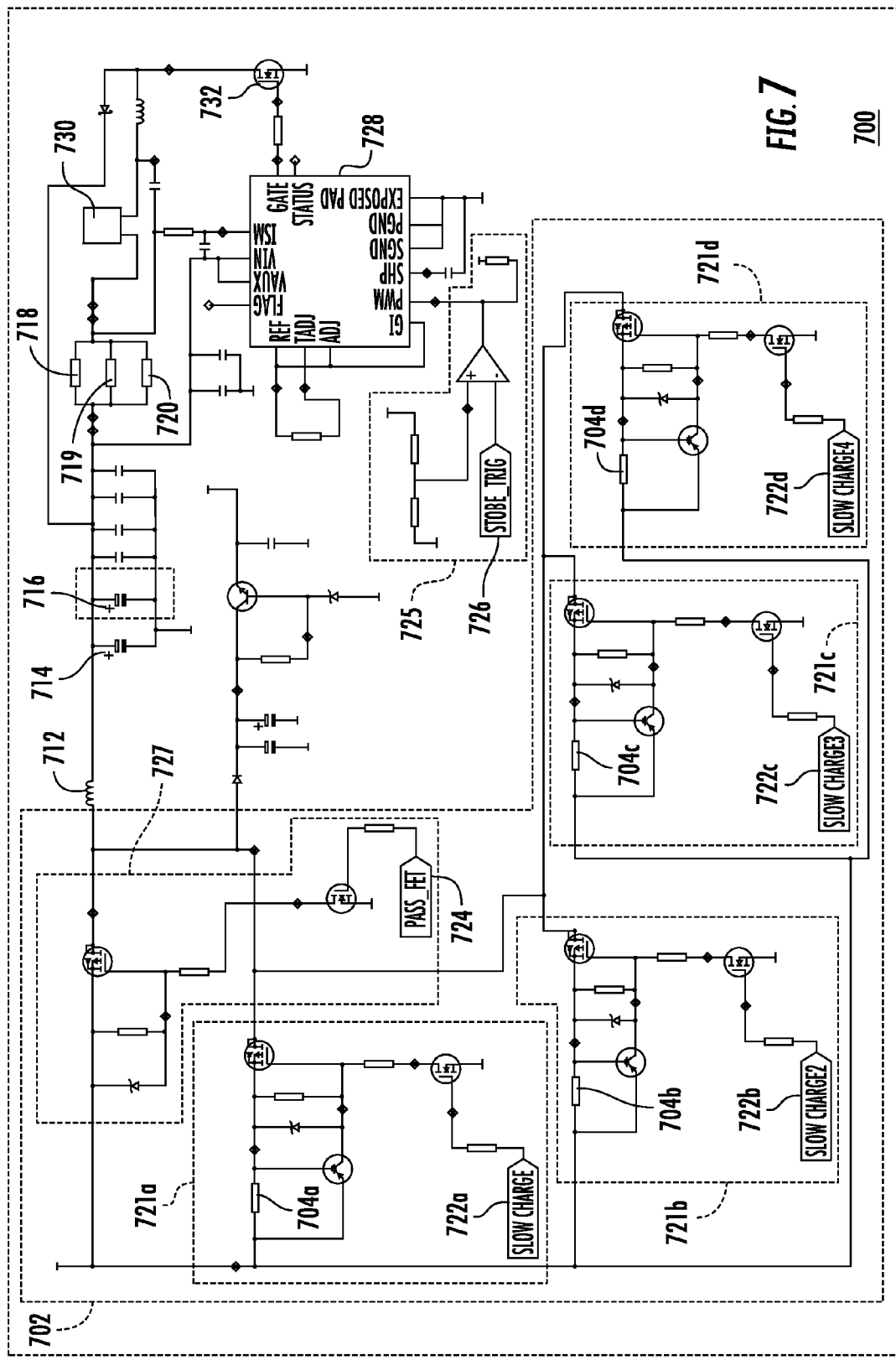
FIG. 7 is a circuit diagram illustrating a variable output LED strobe drive circuit in accordance with an embodiment of the present disclosure.

Referring to FIG. 7, an exemplary variable output drive circuit 700 in accordance with the present disclosure is shown. The drive circuit 700 may be substantially similar to the drive circuit 300 described above, and may include an inductor 712, capacitors 714 and 716, resistors 718, 719, and 720, a strobe trigger line 726, a LED driver 728, and a LED 730 that may be operatively interconnected in substantially the same manner as the inductor 312, the capacitors 314 and 316, the resistors 318 and 320, the strobe trigger line 326, a LED driver 328, and the LED 330 described above. However, whereas the drive circuit 300 included an inrush control 302 having a single slow charge circuit 321, the drive circuit 700 may be provided with multiple slow charge circuits 721a, 721b, 721c, and 721d, each of which may be substantially similar to the slow charge circuit 321 but may correspond to a respective, operator-selectable output level of the drive circuit 700. Particularly, each of the slow charge circuits 721a, 721b, 721c, and 721d may be adapted to charge the storage element (i.e., the capacitors 714 and 716) of the drive circuit 700 using a respective peak current that may provide an amount of charge that is substantially equal to an amount of charge that was most recently depleted to effect a flash of the LED at a selected output level. One or more of the slow charge circuits 721a, 721b, 721c, and 721d may further be adapted to provide the storage element with an initial charge.

In one non-limiting example, a first slow charge circuit 721a in the drive circuit 700 may be provided with a resistor 704a having a first rating $r_1$ that limits a peak current of the first slow charge circuit 721a to a first value $i_1$ that corresponds to a lowest operator-selectable output setting of the drive circuit 700. A second slow charge circuit 721b in the drive circuit 700 may be provided with a resistor 704b having a second rating $r_2$ that limits a peak current of the second slow charge circuit 721b to a second value $i_2$ that corresponds to a second lowest operator-selectable output setting of the drive circuit 700, wherein $r_2 < r_1$ and $i_2 > i_1$. A third slow charge circuit 721c in the drive circuit 700 may be provided with a resistor 704c having a third rating $r_3$ that limits a peak current of the third slow charge circuit 721c to a third value $i_3$ that corresponds to a third lowest (or second highest) operator-selectable output setting of the drive circuit 700, wherein $r_3 < r_2$ and $i_3 > i_2$. A fourth slow charge circuit 721d in the drive circuit 700 may be provided with a resistor 704d having a fourth rating $r_4$ that limits a peak current of the first slow charge circuit 721d to a fourth value $i_4$ that corresponds to highest operator-selectable output setting of the drive circuit 700, wherein $r_4 < r_3$ and $i_4 > i_3$.

In order to initially charge one or both of the capacitors 714 and 716 to a level that will support an initial flash of the LED 730 at a selected output and that will also maintain an active state of the LED 730 so that the LED 730 can be recharged and reflashed without interruption, a slow charge circuit having a sufficiently high peak current must be employed. For example, if a highest outputting setting is selected, the fourth slow charge circuit 721d may be employed to initially charge one or both of the capacitors 714 and 716 and to recharge the capacitors 714 and 716 after each flash of the LED 730. If a second highest outputting setting is selected, the fourth slow charge circuit 721d may again be employed to initially charge one or both of the capacitors 714 and 716, but the third slow charge circuit 721c may be employed to recharge the capacitors 714 and 716 after each flash of the LED 730. If a third highest outputting setting is selected, the third slow charge circuit 721c may be employed to initially charge one or both of the capacitors 714 and 716, but the second slow charge circuit 721b may be employed to recharge the capacitors 714 and 716 after each flash of the LED 730. If a fourth highest outputting setting (i.e., the lowest output setting) is selected, the second slow charge circuit 721b may be employed to initially charge one or both of the capacitors 714 and 716, but the first slow charge circuit 721a may be employed to recharge the capacitors 714 and 716 after each flash of the LED 730. It will be understood that the above-described manner in which the slow charge circuits 721a, 721b, 721c, and 721d are employed to initially charge and subsequently recharge one or both of the capacitors 714 and 716 is provided by way of example only. It is contemplated that the slow circuits 721a, 721b, 721c, and 721d can be similarly employed in a variety of other ways to effectuate charging and recharging of one or both of the capacitors 714 and 716 depending on the particular operator-selectable output settings that are provided. For example, an alternative embodiment of the drive circuit 700 is contemplated wherein the fourth slow charge circuit 721a (having the highest peak current) is employed to provide an initial charge of one or both of the capacitors 714 and 716 for any operator-selected output setting, and wherein one of the first, second, third, or fourth slow charge circuits 721a, 721b, 721b, and 721d corresponding to the particular output setting that has been selected is employed to recharge the capacitors 714 and 716 after each flash of the LED 730.

Figure 8:
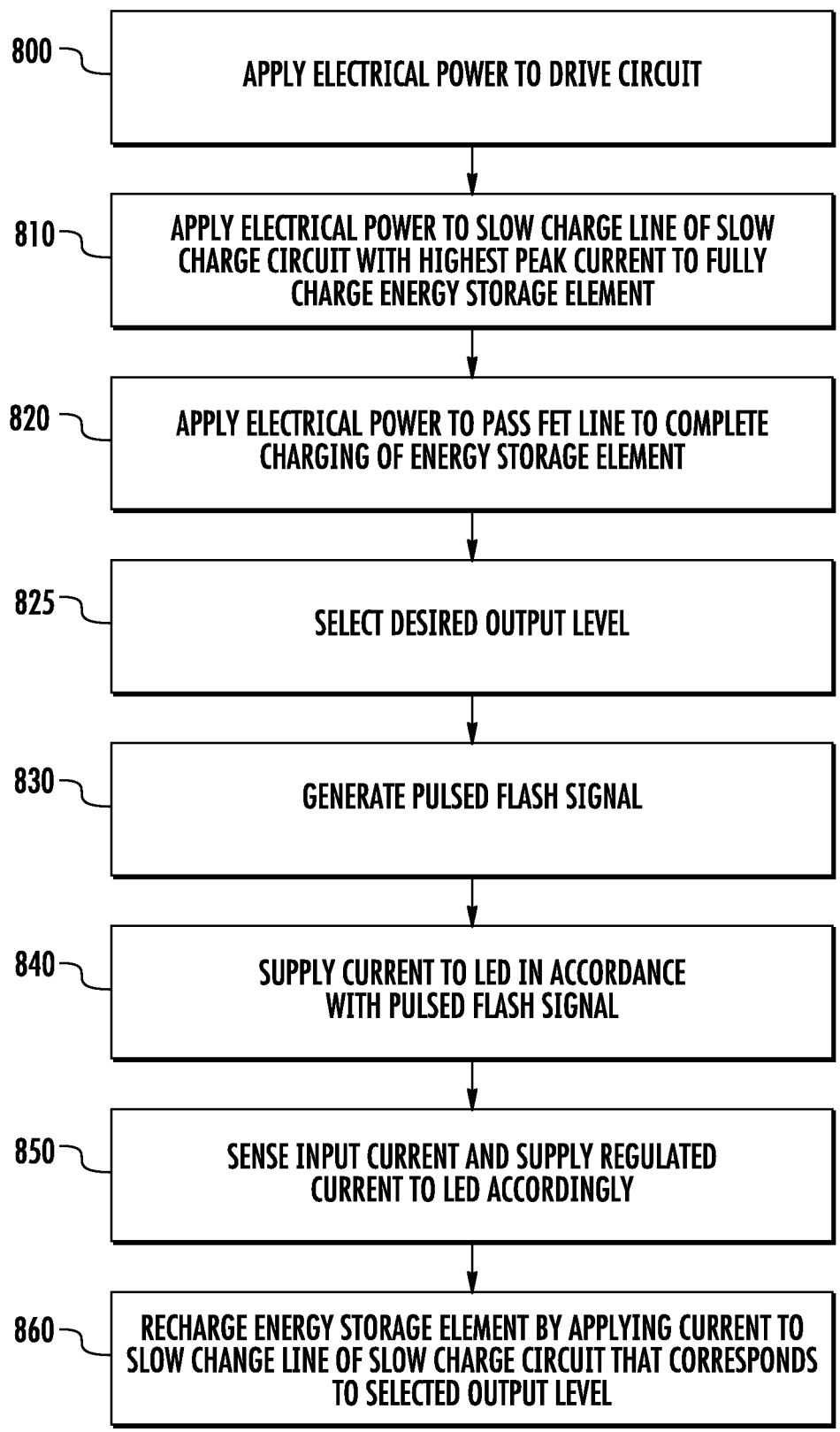
FIG. 8 is a flow diagram illustrating a method of operating the variable output drive circuit shown in FIG. 7 in accordance with the present disclosure.

Referring to FIG. 8, a flow diagram illustrating an exemplary method of implementing the drive circuit 700 in accordance with the present disclosure is shown. The method will now be described in detail in conjunction with the schematic representation of the drive circuit 700 shown in FIG. 7.

Operation of the LED strobe drive circuit 700 may be initiated by the application of electrical power to the drive circuit 700 by a NAC (not shown), such as may be provided upon the detection of a hazardous condition by sensing elements within an emergency notification system (step 800 in FIG. 8). A control device (not shown) may receive the electrical power from the NAC and apply at least a portion of the power on a slow charge control line (e.g., slow charge control line 722*d*) of the slow charge circuit (e.g., slow charge circuit 721*d*) that has a peak current that is suitable for slowly charging one or both of the capacitors 714 and 716 (step 810 in FIG. 8) to a full, initial charge that is sufficient to flash the LED 730 at the operator-selected output setting. This avoids placing a large current draw on the NAC upon circuit activation (such as may be caused by an initial spike in current) that could otherwise cause the NAC to reach an overcurrent condition when a plurality of serially-connected drive circuits are activated simultaneously. As the capacitors 714 and 716 approach full charge, the control device applies current to a bypass control line 724 of the drive circuit 700, thereby bypassing the slow charge circuit 721*a* to charge the capacitors 714 and 716 to a level substantially equal to the input voltage from the NAC (step 820 in FIG. 8). Completing the charging of the capacitors 714 and 716 in this manner overcomes the voltage drop associated with the slow charge circuit 721*a*.

An operator may select a desired output setting for the drive circuit (step 825 in FIG. 8), such via an operator interface. In one non-limiting example of the method, the operator may select one of four different output settings. A first such output setting may be adapted to cause the LED 730 to produce a 15 candela strobe. A second output setting may be adapted to cause the LED 730 to produce a 30 candela strobe. A third output setting may be adapted to cause the LED 730 to produce a 75 candela strobe. A fourth output setting may be adapted to cause the LED 730 to produce a 110 candela strobe. It will be understood that the listed output values are provided by way of example only, and that the values can be widely varied and that fewer or additional operator-selector values may be implemented without departing from the scope of the present disclosure A control device (not shown), which may be the same control device discussed above, may receive an activation signal from the NAC. In response to the activation signal, the control device may apply a pulsed flash signal on a strobe trigger line 726 of driver interface circuit 725 (step 830 in FIG. 8). The flash signal may have predefined duration, frequency, and intensity characteristics, such as may be configured in the control device and communicated from the operator-selected output setting. It is contemplated that certain characteristics of the flash signal can be manually adjusted as will be described below.

The flash signal output from the driver interface circuit 725 is applied to the LED driver 728, which also receives an input current from the current sensing resistors 718 and 720. The LED driver 728 is configured to supply current to the LED 730 in a pulsed pattern that substantially mirrors the duration, frequency, and intensity characteristics of the flash signal on the strobe trigger line 726 (step 840 in FIG. 8). The LED 730 is thereby caused to emit a strobe pattern that also substantially mirrors the duration, frequency, and intensity characteristics of the flash signal.

To achieve current regulation, the LED driver 728 senses the input current at the resistors 718 and 720 and provides current to the LED 730 by cycling the switch 732 as necessary to intermittently establish a path for current to flow from the LED driver 728 to the LED 730 to account for voltage drops in the driver circuit 700 (step 850 in FIG. 8). The LED 730 is thereby provided with a highly regulated level of current that is consistent from pulse to pulse, thus resulting in strobe flashes that are consistent in both intensity and color. The inductor 712 is provided for preventing electrical signal noise generated by the current regulating components of the drive circuit 700 from being transmitted into the NAC wiring.

After the capacitors 714 and 716 have been discharged to flash the LED at the selected output as described above, it is generally necessary to recharge the capacitors 714 and 716 before effectuating a subsequent discharge. However, instead of simply applying power from the NAC on the slow charge control line 722*d* of the slow charge circuit 721*d* as in step 810 of the exemplary method, power from the NAC may instead be applied to the slow charge control line of whichever of the slow charge circuits 721*a*, 721*b*, 721*c*, and 721*d* corresponds to an output setting for a most recent flash of the LED (step 860 in FIG. 8), thereby recharging the capacitors 714 and 716 only as much as may be necessary to regain a full charge. For example, if the LED 730 was most recently flashed at a lowest operator-selected output setting (e.g., 15 candela), power from the NAC may be applied on the slow charge control line 722*a* of the first slow charge circuit 721*a* having the lowest peak current $i_1$. Alternatively, if the LED 730 was most recently flashed at a second lowest operator-selected output setting (e.g., 30 candela), power from the NAC may be applied on the slow charge control line 722*b* of the second slow charge circuit 721*b* having the second lowest peak current $i_2$. Alternatively, if the LED 730 was most recently flashed at a third lowest (or second highest) operator-selected output setting (e.g., 75 candela), power from the NAC may be applied on the slow charge control line 722*c* of the third slow charge circuit 721*c* having the third lowest (or second highest) peak current $i_3$. Alternatively, if the LED 730 was most recently flashed at a highest operator-selected output setting (e.g., 110 candela), power from the NAC may be applied on the slow charge control line 722*d* of the fourth slow charge circuit 721*c* having the highest peak current $i_4$.

Implementing a variable output drive circuit with an inrush control having multiple slow charge circuits as descried above facilitates the periodic application of peak currents that are lower than a highest peak current of the drive circuit depending on an operator-selected output setting of the drive circuit. This may reduce power supply loading, IR losses, and repetitive RMS currents associated with such a drive circuit relative to a variable output drive circuit having only a single slow charge circuit. This may advantageously allow a greater number of drive circuits to be implemented in a single NAC.

In view of the forgoing, it is apparent that by regulating the current through the LED 210 the effects of forward voltage drop in the drive circuit 200 on light output from the LED 210 can be minimized while reducing other tolerance effects to only those presented by the current sensing element (e.g. resistors 318 and 320 in FIG. 4) of the current regulator 206. Current regulation facilitates consistency of light output color among a group of strobe appliances that are connected in series, especially at higher drive currents. Still further, current regulation facilitates a broader operating voltage range when compared to conventional strobe appliances that employ buck or boost converters because current levels can be regulated down to the limits of circuit component voltage stack up.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A variable output LED strobe drive circuit comprising:
   an energy storage component;
   a current regulator electrically coupled to the energy storage component for sensing and regulating a current supplied by the energy storage element;
   a LED electrically coupled to the current regulator;
   a flash control element electrically coupled to the current regulator for generating a flash pulse signal that dictates a pulsed pattern with which current is allowed to flow from the current regulator to the LED;
   an output control having an operator interface for allowing an operator to select a desired light output level, wherein the output control is electrically coupled to the current regulator for varying the amount of current supplied to the LED; and
   an inrush control including a plurality of slow charge circuits, wherein each slow charge circuit is configured to provide a respective peak current for charging the energy storage component by an amount that corresponds to the operator-selected light output level.

2. The drive circuit of claim 1, wherein the current regulator comprises a current sensing component and a control device coupled to the current sensing component and to the LED for delivering current to the LED in response to the sensed current.

3. The drive circuit of claim 1, further comprising a filter component electrically coupled to the current regulator for filtering an amount of electrical signal noise produced by the current regulator.

4. The drive circuit of claim 1, wherein the light output control is electrically coupled to the flash control element for varying the characteristics of the flash pulse.

5. The drive circuit of claim 1, wherein a first of the slow charge circuits has a first peak current and a second of the slow charge circuits has a second peak current, the second peak current being greater than the first peak current.

6. The drive circuit of claim 5, wherein the first of the slow charge circuit includes a first current-limiting resistor and the second slow charge circuit incudes a second current-limiting resistor, the second current-limiting resistor having a lower rating than the first current-limiting resistor.

7. A LED strobe drive circuit comprising:
   a current sensing element;
   a LED electrically coupled to the current sensing element;
   a current regulator electrically coupled to the current sensing element and to the LED for supplying an amount of current to the LED in response to a current sensed by the current sensing element;
   a switch electrically coupled to the current regulator and to the LED for generating a flash pulse signal that dictates a pulsed pattern with which current is allowed to flow to the LED;
   an output control having an operator interface for allowing an operator to select a desired light output level, wherein the output control is electrically coupled to the current regulator for varying the amount of current supplied to the LED; and
   an inrush control including a plurality of slow charge circuits, wherein each slow charge circuit is configured to provide a respective peak current for charging the energy storage component by an amount that corresponds to the operator-selected light output level.

8. The drive circuit of claim 7, wherein the current regulator comprises a control device coupled to the current sensing component and to the LED for delivering current to the LED in response to the sensed current.

9. The drive circuit of claim 7, further comprising a filter component electrically coupled to the current regulator for filtering an amount of electrical signal noise produced by the current regulator.

10. The drive circuit of claim 7, wherein the output control is electrically coupled to the flash control element for varying the characteristics of the flash pulse.

11. A method for driving a LED strobe comprising:
    charging an energy storage element with an input current;
    selecting a first light output level;
    generating a pulsed electrical signal that is in part defined by the selected light output level;
    allowing current to flow from the energy storage element to the LED in accordance with the pulsed electrical signal;
    sensing the input current and providing a corresponding regulated current to the LED; and
    recharging the energy storage element by applying the input current to a first slow charge circuit having a first peak current that corresponds to the selected first light output level.

12. The method of claim 11, wherein charging the energy storage element comprises:
    applying the input current on a slow charge line connected to the energy storage element for charging the energy storage element at a predetermined rate; and
    applying the input current on a bypass control line connected to the energy storage element to fully charge the energy storage element.

13. The method of claim 11, further comprising preventing electrical signal noise from being transmitted into NAC wiring.

14. The method of claim 11, wherein selecting a light output level includes supplying an amount of current to the LED according to a manually set control.

15. The method of claim 11, further comprising defining a desired light output level by varying characteristics of the pulsed electrical signal according to a manually set control.

16. The method of claim 11, further comprising recharging the energy storage element by applying the input current to a second slow charge circuit having a second peak current that corresponds to a selected second light output level, wherein the second peak current is different from the first peak current and the second light output level is different from the first light output level.

* * * * *